Nov. 10, 1942.   R. B. McKINNIS   2,301,901
APPARATUS FOR EXTRACTING
Filed Dec. 15, 1939

Inventor
RONALD B. McKINNIS
By Semmes, Keegin & Semmes
Attorney

Patented Nov. 10, 1942

2,301,901

UNITED STATES PATENT OFFICE 2,301,901

APPARATUS FOR EXTRACTING

Ronald B. McKinnis, Winter Haven, Fla., assignor to Sunshine Foods Inc., Winter Haven, Fla., a corporation of Florida Application December 15, 1939, Serial No. 309,492

6 Claims. (Cl. 210—66)

The present invention relates to an apparatus for preventing oxidation of liquids, and more particularly for preventing oxidation of juices of fruits and vegetables by atmospheric oxygen.

This application is directed more particularly to the apparatus described in this application.

In extracting the juice from fruits and vegetables, oxygen of the air starts processes of oxidation in the juice which eventually will spoil the taste of the juice and cause deterioration in the vitamin content. To obviate this deterioration through oxidation, I have devised an apparatus employing extraction in an inert atmosphere, and sealing in containers under non-oxidizing conditions.

The present invention relates to an apparatus which will permit extraction in the open atmosphere yet will prevent the start of the deleterious oxidation above indicated.

In the instant apparatus, the juice is extracted and then quickly passes, before oxidation has set in, or before any large quantity of atmospheric oxygen has become incorporated in the juice, to a purging step wherein the juice is subjected to the action of inert gases whereby the atmospheric oxygen is purged from the juice.

In general, the apparatus consists of a rotary conical member which is foraminous, and which discharges the juice in a stream in a current of inert gas, such as carbon dioxide, nitrogen, or a mixture of the two, or other inert gases. The inert gases contact the juice in spray form, or in droplet form, and purge the atmospheric oxygen from the contained juice. The juice is gathered in a collection chamber within the centrifugal apparatus in an atmosphere of inert gas, and from thence can be sent to containers or cans, where the juice is stored under non-oxidizing conditions.

It is an object of my invention to devise an apparatus which will permit juices of fruits and vegetables to be extracted and passed to storage or canning without deterioration from the action of atmospheric oxygen.

A further object of the invention is to provide an apparatus which will permit extraction under ordinary atmospheric conditions, and yet which will inhibit the progressive oxidation to which juices are ordinarily subject when extracted under these conditions.

Other objects will be apparent from the ensuing description which shows a simple form of apparatus which is cheap to construct and inexpensive to operate.

Figure 1:
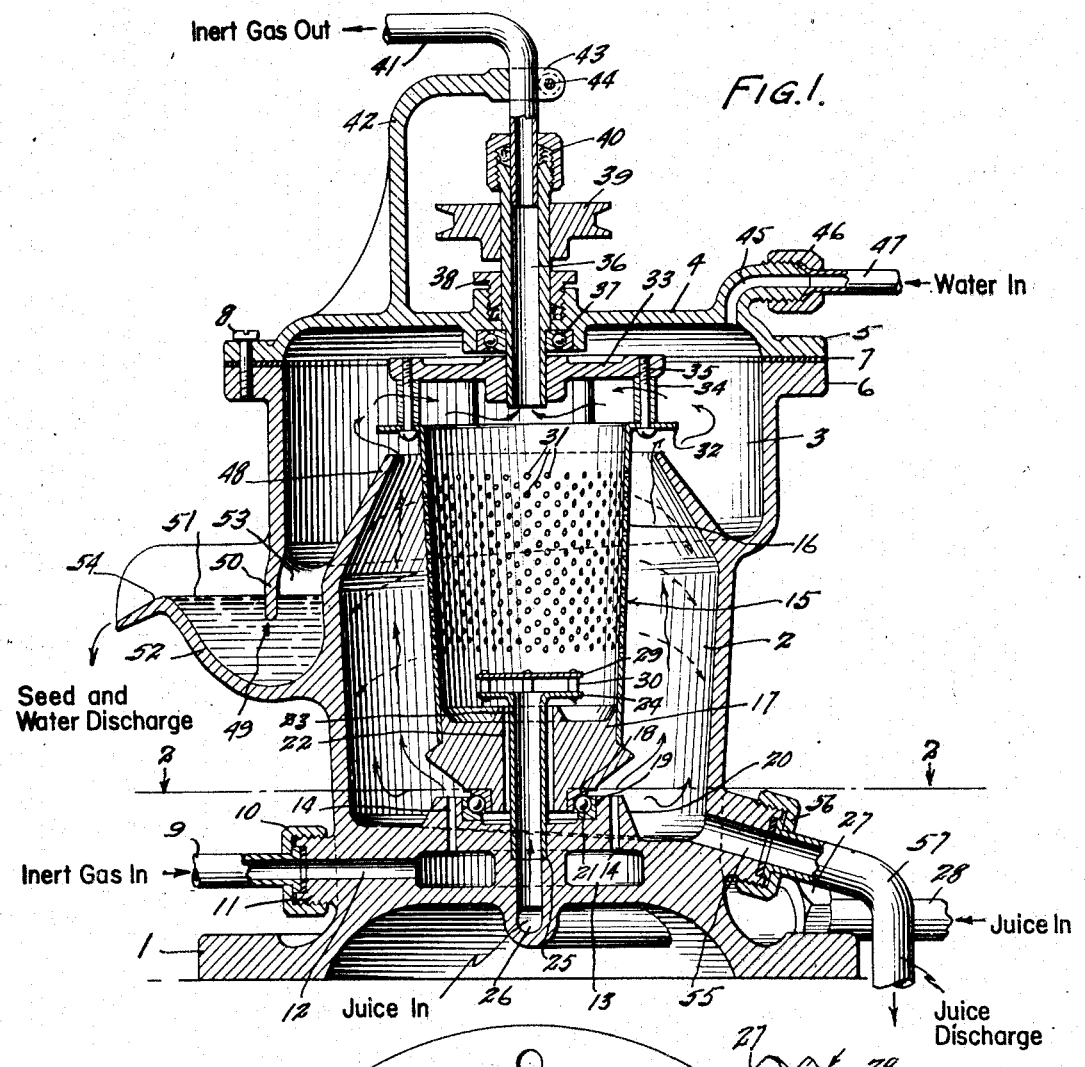
Figure 1 is a longitudinal sectional view taken through the purging apparatus.

Referring to the drawing, I have shown a base casting 1 which is formed into a juice catching chamber 2 at its lower part and is formed with a seed catching chamber 3 at its upper end. The seed catching chamber is provided with a lid 4 which has a rim 5 that lies adjacent a flange 6 formed on the seed catching chamber of the main casting. Between the rim 5 and flange 6 is a fluid tight packing 7. The lid 4 may be attached by a series of bolts 8.

Inert gas is admitted into my centrifuge at the lower part thereof through an inert gas inlet line 9, which, through a suitable packing joint 10, is attached to a screw-threaded nipple 11 formed in the base 1. The nipple 11 is provided with an interior central aperture 12 which communicates with a gas chamber 13. The gas chamber 13 is provided with apertures 14 which conduct the gas, as indicated by the arrows in Fig. 1, into the juice catching chamber 2.

Mounted in the juice catching chamber 2 is a rotating centrifugal conical element, indicated generally by the numeral 15, which comprises a tapered sleeve 16 mounted on a base 17. The base 17 is provided at its lower end with a ball race 18, which lies adjacent to a ball race 19 formed in an annular projection 20 of the base 1. Between the ball races 18 and 19 are a series of ball bearings 21. Thus the conical member 16 is mounted for rotation on the base 1.

Through a central aperture 22 formed in the base 17 is adapted to extend an inlet nozzle 23 which has a flanged top 24. The inlet nozzle 23 fits within an aperture 25 formed in the base 1. The base 1 is provided with a juice inlet aperture 26 which through a fluid tight connection 27 is connected to a juice inlet pipe 28. Mounted above the flange 24 of the nozzle 23 is a spreader plate 29 which is held spaced from the flanged top 24 by means of suitable spacers 30.

The arrangement of the nozzle is such that juice passing through the juice inlet pipe 28 and juice aperture 26 is discharged by the nozzle against the plate 29 and spread out in disc form where it impinges on the interior of the rotating conical element 15.

Figure 2:
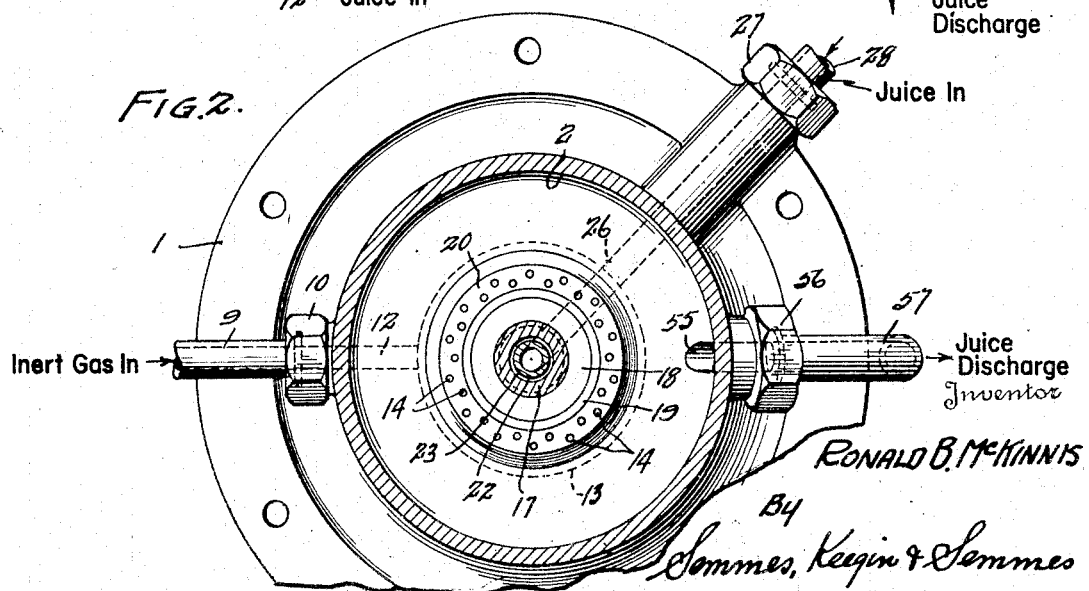
Fig. 2 is a view taken along the line 2—2 of Fig. 1, looking in the direction of the arrows.

The rotating conical element 15 is provided with apertures 31 so that the juice discharged against its inner surface, in its passage up from the small end of the conical element 15 to the larger end, will be thrown out in spray form through the apertures into the juice catching chamber 2 surrounding the conical element 15. The direction of the flow of juice is indicated in dotted arrows in Fig. 2. The direction of flow of the inert gas, such as carbon dioxide, nitrogen, a mixture of the two, or other inert gas, is indicated by the solid arrows.

Formed on the larger open end of the conical rotating element 15 is a flange 32 which is attached to and held in spaced relation from a driving disc 33 by means of spacers 34 and bolts 35.

The drive disc 33 is attached to a hollow spindle 36 which is journaled in a ball bearing construction indicated generally by the numeral 37 in the lid or cover 4. A packing gland construction, indicated generally by the numeral 38, provides a fluid tight fit between the hollow spindle 36 and the cover plate 4, while permitting free rotation of the hollow spindle 36.

To drive the hollow spindle 36 I have provided a pulley 39 which is adapted to be driven by a belt (not shown) from a suitable source of power (not shown). Connected through a fluid tight joint, indicated generally by the numeral 40, with the interior of the hollow spindle 36 is an inert gas outlet pipe 41 which is supported on a bracket 42 carried by the lid 4. The inert gas outlet pipe 41 is held between arms 43 on the bracket 42, the arms being held together by means of bolts 44.

Water is supplied to the seed collecting chamber 3 of the body casting by means of a nipple 45 which, through a fluid tight joint indicated generally by the numeral 46, communicates with a water inlet pipe 47.

Between the seed collecting chamber 3 and the juice collecting chamber 2 is an upwardly sloping baffle wall 48 which prevents splashing of the juice from the juice collecting chamber 2 into the seed collecting chamber. The seed collecting chamber is provided with a water seal 49 through which the seeds and water from the chamber are discharged into the atmosphere. This water seal comprises a downwardly projecting section 50 of the wall of the seed collecting chamber 3, whose lower end lies below the surface 51 of water in a bowl 52. The seeds and water are discharged through a chute 53 formed in the seed collecting chamber 3, into the bowl 52, and the seeds and water then pass over a seed and water discharge chute 54. The arrangement is such that seeds discharged from the top of the rotating member 15 will fall into the seed collecting chamber 3 and be swept out of that chamber by a stream of water entering the chamber through a nozzle 45. This water and the seeds and larger particles will pass down through the chute 53 into the bowl 52 and the seeds, water and large particles will be discharged out of the apparatus over the discharge chute 54.

Juice is adapted to be discharged from the bottom of the juice collecting chamber 2 through a nipple 55 connected through a fluid tight joint, indicated generally by the numeral 56, to a juice discharge 57.

In operation the juice soon after the extracting operation in the open atmosphere is passed through juice inlet pipe 28 and passes through the juice nozzle 23. The plate 29 deflects the juice to the base of the inner surface of the rotating conical member 15 and the juice rests on the interior wall of the conical member 15 by reason of centrifugal force and because of the conical shape of the member 15. The juice is sprayed out in the form of spray or droplets through the apertures 31 formed in the sleeve 16. Inert gas enters the gas manifold 13 through inert gas pipe 9 and is discharged through apertures 14, as indicated by the arrows, into the juice catching chamber, and flows through the sprays or droplets of juice, as indicated, and passes out over the baffle 48 and into the rotating spindle 36, and from thence into the inert gas discharge line 41.

The atmospheric oxygen in the juice is purged out of the juice during this operation and the juice which is collected in the bottom of the juice chamber 2 is discharged through the juice discharge line 57.

The larger particles of the pulp and the seeds are discharged over the flange 32 formed on the top of the rotating conical element 15 into the seed collecting chamber 3 where, as before described, the water admitted through the pipe 47 causes the seeds and larger particles to be swept down through the water seal 49 and out of the apparatus.

In a typical operation the oranges, grapefruit, or other fruits or vegetables, are subjected to a rapid extraction in order to minimize oxidation. After this rapid extraction the juice is passed immediately to the closed centrifuge, just above described, where the juice and seeds are separated. The juice is subjected to the purging action of the centrifuge apparatus in which inert gas flows through the spray or droplets discharged through the apertures 31 in the rotating conical element 15. The seeds and large particles of pulp are passed by reason of the centrifugal action out of the top of the rotating element 15 into the seed discharge chamber and are discharged out of the apparatus through a water seal. This water seal prevents the access of oxygen from the atmosphere into the interior of the centrifuge apparatus.

It is to be noted that the inert gas moves in a stream continuously through the centrifuge to purge the juice containing the oxygen. The juice from the juice collecting chamber 2 of the centrifuge may be passed to a flash pasteurization step and thence to containers, such as large storage containers, or to cans. The flash pasteurization step may be omitted, and the pasteurization may occur after the juice has been admitted to the containers or cans.

In a typical operation the juice may be filled into cans which have been pre-heated to a temperature above the condensation point of steam so as to prevent condensation, the cans are then filled with live steam by means of a steam jet, and the juice then filled in the cans under a blanket of the steam, the juice entering from the bottom of the cans, the speed of filling being regulated so that a turbulence of the juice in the cans will not cause the blanket of protecting steam to be broken to permit objectionable contamination of the juice by the oxygen of the atmosphere. The cans having been filled, they may be quickly sealed to prevent any oxidation of the contents.

Where flash pasteurization has been employed prior to filling the containers or cans, it will be unnecessary to subject the juice to a further pasteurization step. Where no flash pasteurization has been employed, however, the juice can be pasteurized within the cans. Likewise where large containers are filled with juice for bulk storage purposes, the juice may be pasteurized in these large containers if desired.

It will be noted that my process and apparatus permit the juice to be extracted in the atmosphere but by reason of quickly passing it to a purging operation, the usual deleterious effects of atmospheric extraction are eliminated. Before objectionable oxidation can take place, the juice is purged by the action of the inert gas on the sprays or droplets of juice and contamination by atmospheric oxygen is prevented, as described. Under such conditions of extraction and canning or storage, the juice will last for a much longer time without deterioration in taste or vitamin content than is the case with ordinary canning operations.

I desire that my invention be limited only by the showing of the prior art and the scope of the appended claims.

I claim:

1. An apparatus for purging atmospheric oxygen from fruit and vegetable juices comprising a source of juice, a foraminous member, means to force the juice through the foraminous member, a seed collecting chamber adjacent to the upper end of the foraminous member, a source of inert purging gas, means to cause relative movement between the juice after passage through the foraminous member and the inert purging gas, and additional means to prevent the access of oxygen into said seed collecting chamber.

2. An apparatus for purging atmospheric oxygen from fruit and vegetable juices comprising a source of juice, a foraminous member, means to force the juice through the foraminous member, a juice collecting chamber adapted to be filled with inert gas, a seed collecting chamber adjacent to the upper end of the foraminous member, a source of inert purging gas, means to cause relative movement between the juice after passage through the foraminous member and the inert purging gas, and additional means to prevent the access of oxygen into the seed collecting chamber.

3. An apparatus for purging atmospheric oxygen from fruit and vegetable juices comprising a source of juice, a rotating member with apertures therein through which apertures the juice is thrown by centrifugal force, a seed collecting chamber adjacent to the upper end of the foraminous member, a source of inert gas for purging, means to cause relative movement between the juice after passage through the rotating member and the inert purging gas, and a water seal through which the seeds are adapted to pass in communication with the seed collecting chamber, said seal preventing access of oxygen to the seed collecting chamber.

4. An apparatus for purging atmospheric oxygen from fruit and vegetable juices comprising a source of juice, a rotating member with apertures therein through which apertures the juice is thrown by centrifugal force, a juice collecting chamber adapted to be filled with inert gas, a seed collecting chamber adjacent to the upper end of the foraminous member, a source of inert gas for purging, means to cause relative movement between the juice after passage through the rotating member and the inert purging gas, and a water seal through which the seeds are adapted to pass in communication with the seed collecting chamber, said seal preventing access of oxygen to the seed collecting chamber.

5. A device for purging oxygen from juice comprising a juice collecting chamber, a source of inert gas from which gas flows through the juice collecting chamber, a foraminous inverted frusto-conical basket on whose inner surface the juice is adapted to spread in a film and be thrown into the juice collecting chamber through the apertures, a seed collecting chamber adjacent to the upper end of the foraminous member into which seeds are thrown from the upper end of the basket, and means preventing access of oxygen to the seed collecting chamber.

6. A device for purging oxygen from juice comprising a juice collecting chamber, a source of inert gas from which gas flows through the juice collecting chamber, a foraminous inverted frusto-conical basket on whose inner surface the juice is adapted to spread in a film and be thrown through the apertures into the juice collecting chamber, a seed collecting chamber adjacent to the upper end of the foraminous member into which seeds are thrown from the larger end of the tapered member, and a water seal through which the seeds are discharged from the seed collecting chamber, said water seal preventing access of oxygen to the seed collecting chamber.

RONALD B. McKINNIS.